United States Patent

[11] 3,581,051

| [72] | Inventor | Kenneth William Brown<br>Cambridge, England |
| [21] | Appl. No. | 748,387 |
| [22] | Filed | July 29, 1968 |
| [45] | Patented | May 25, 1971 |
| [73] | Assignee | National Research Development<br>Corporation<br>London, England |
| [32] | Priority | Aug. 1, 1967, Feb. 29, 1968, Mar. 8, 1968 |
| [33] | | Great Britain |
| [31] | | 35,247/67, 9,906/68 and 11,429/68 |

[54] WELDING APPARATUS
10 Claims, 5 Drawing Figs.

[52] U.S. Cl. .................................................. 219/131,
219/132
[51] Int. Cl. .................................................. B23k 9/10
[50] Field of Search ........................................... 219/132,
131, 130, 135

[56] References Cited
UNITED STATES PATENTS

| 2,686,239 | 8/1954 | Burbeck .................. | 219/132X |
| 3,267,251 | 8/1966 | Anderson ................. | 219/125PL |
| 3,317,811 | 5/1967 | Normando et al. ......... | 219/131RX |
| 3,350,539 | 10/1967 | Manz et al. .............. | 219/131X |

*Primary Examiner*—J. V. Truhe
*Assistant Examiner*—Hugh D. Jaeger
*Attorney*—Kemon, Palmer and Estabrook

ABSTRACT: In a consumable electrode arc welding process different combinations of the various parameters (open circuit arc voltage, wire feed speed, series inductance, shielding gas) are stored on a plug board by interconnecting each input bus with preselected output buses. The input buses are connected through a selector switch to a voltage source. As the selector switch is moved through its different positions a voltage is applied to the different input buses in turn. The output buses are connected to relays which control the selection of the different parameters.

WELDING APPARATUS

In consumable electrode electric arc welding processes successful and consistent welds are only obtained if the values of each one of a number of interdependent variables are correctly chosen to suit the particular type of weld being made. The correct choice involves a high degree of understanding of the many factors which influence the quality of the weld, and a wrong choice of any one variable is likely to upset the relationship between the other variables. For example, in dip transfer $CO_2$ welding the rate at which wire is fed to the arc must be closely correlated with the open circuit power supply voltage and with the circuit inductance.

There are many applications where small adjustments of these variables need to be made between successive welds in a welding sequence. In these cases, there is naturally a tendency to avoid making all the necessary readjustments by using compromise settings, especially when working some distance away from the apparatus at which the adjustments are made. It is an object of the present invention to provide a simple apparatus, especially for use in portable, lightweight field equipment which will enable an operator to preselect the various combinations he is likely to need during a welding sequence and which will permit these combinations to be switched in at chosen intervals.

The present invention is therefore concerned with an electric arc welding system which includes a welding torch, drive means for feeding a supply of consumable electrode to the arc, a power supply having means for varying the power fed to the welding torch, and means for controlling the wire feed speed. Different values of the required power and wire feed speed are selected by energization of predetermined actuators connected to the said power varying means and the speed control means respectively.

The invention is characterized by the provision of the plug board having input buses and output buses, each of the output buses being connected to the said actuators and the input buses being connected through a selector switch to a voltage source. The different combinations of required power, and wire feed speed are then preselected by interconnecting each input bus with selected output buses. Hence, as the selector switch is moved through its different positions the required different combinations of the selected actuators are energized in turn from the voltage source.

Thus it can be seen that the different combinations of welding parameters which will be required for a particular welding programme are preselected on the selector board and the operator, or his assistant may then select any one of the combinations simply by moving the selector switch to the appropriate position at the appropriate time. Conveniently, the selector switch is mounted on the welding torch.

The main application of such a welding system will be in improving the consistency and quality of welds made under all types of conditions, without taking control of the operation completely out of the hands of the welder. A further application, however, is in the teaching of welding techniques where the playback of a tape recording is synchronized with selection of the different combinations of the welding parameters by the operator so that the operator simultaneously hears a commentary explaining the effects of choosing a particular combination.

By way of example one embodiment of the invention will now be described with reference to the accompanying drawings, in which.

Figure 1:
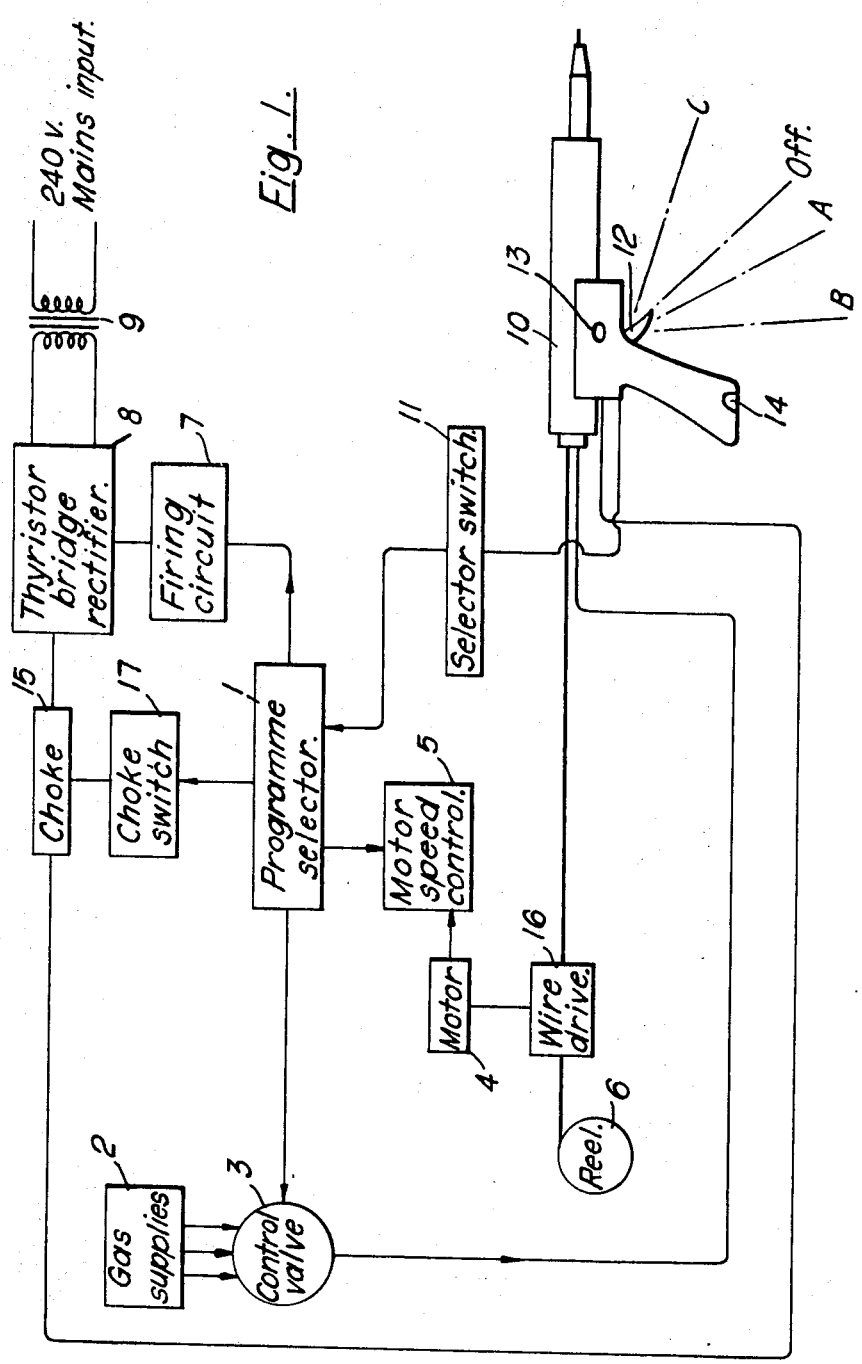
FIG. 1 is a diagrammatic representation of a control system for use in a consumable electrode arc welding system for selecting different combinations of welding parameters.
Figure 2:
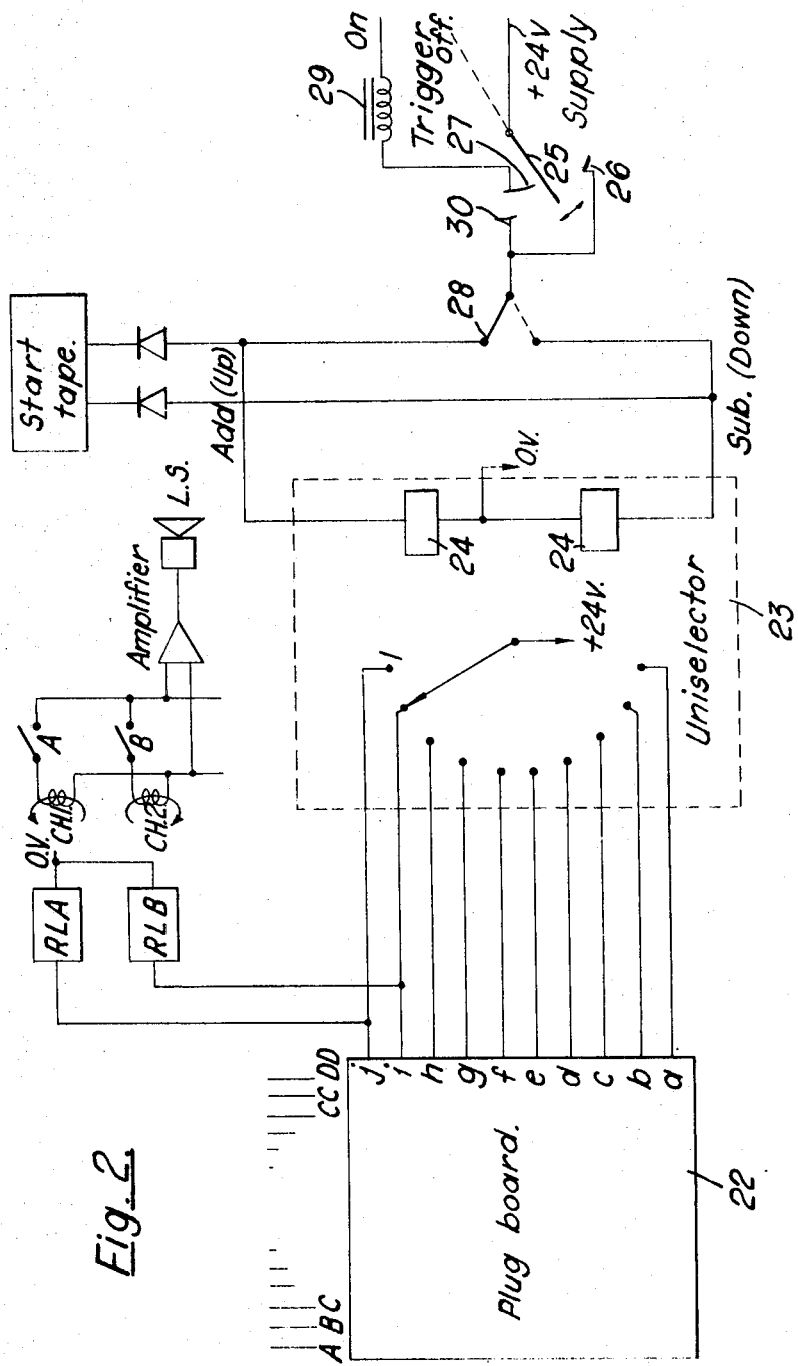
FIG. 2 is a diagrammatic representation of the circuits involved in FIG. 1 for selecting the different combinations of parameters.

Referring to FIGS. 1 and 2, a welding torch 10 is fed with consumable electrode wire from a reel 6. The wire is fed forward by a positive wire feed device 16. One such device, where the wire is fed into a groove formed round the periphery of a drive wheel and is held in position by a group of closely spaced, freely rotatable pressure rolls extending round a small arc of the wheel, is more fully described and separately claimed in our copending British application Ser. No. 36,534/67. The wire feed rate is determined by the speed of the motor 4 connected to the drive wheel of the wire feed device 16, and a servo-operated motor speed control 5 is provided. The latter is shown more fully in FIG. 5. The welding torch 10 is also fed a shielding gas from the gas supply unit 2. The actual composition and flow rate of the gas is controlled through solenoid operated control valves 3.

Power is supplied to the torch from a mains input through a transformer 9 and a thyristor controlled bridge rectifier 8. The magnitude of the open circuit arc supply voltage is controlled by varying the phase angle of the thyristors in the bridge circuit using the firing circuit 7. This is described more fully with reference to FIG. 4. In dip transfer welding the series inductor value can be altered by selecting one of a number of tappings along a choke 15 through the choke switch 17.

Hence, it can be seen that there are several welding parameters, the values of which must be correctly set before being fed to the welding torch. The interrelation of all these parameters is controlled from the programme selector 1 where different preselected combinations of the parameters are stored and selected one at a time by the selector switch 11. The means whereby the programmes are selected is shown more fully in FIGS. 2 and 3.

Figure 3:
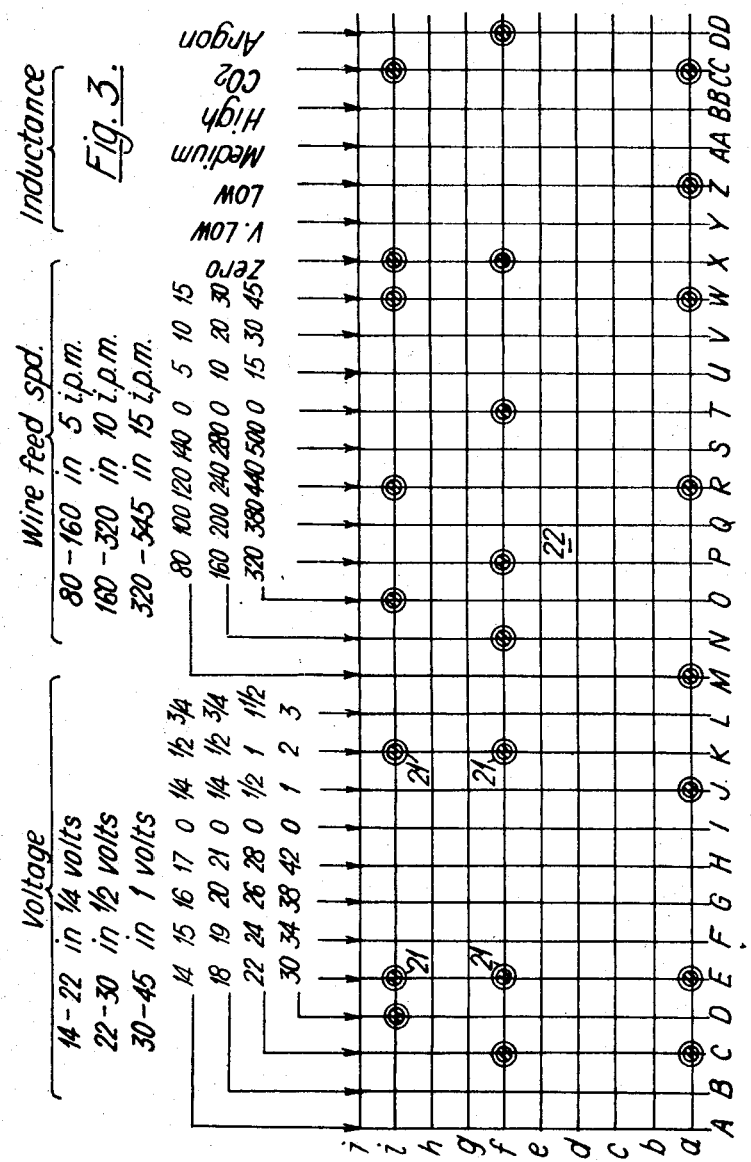
FIG. 3 shows a typical programmed selector board for use in the control system of FIG. 1.

Referring to FIGS. 2 and 3, 10 individual programmes may be selected by inserting diode connector pins into the top deck of a selector plugboard 22 to connect selected ones of the output bus bars "A" to "DD" with each of the input bus bars "a" to "j." A 24 volt constant voltage supply is connected through a 10 position uniselector 23 to the input buses "a" to "j." As the different contacts of uniselector are closed each of the preselected programmes is chosen in turn. The output buses are connected to relays which when energized connect the appropriate choke tapping and gas supply, and also control the firing point of the thyristors and the wire feed rate.

The 10 position uniselector is fed with pulses from the welding torch. The trigger member 12 (FIG. 1) operates a trigger contact member 25 and moves between four predetermined positions. In FIG. 2 the contact member is shown in the off position. If the trigger is now pushed from the off position to the position C (FIG. 1) then the moving contact 25 moves on to the fixed contact 26. Consequently a pulse is produced from the 24 volt supply and passes through the switch 28 along one of the alternative paths "add" or "subtract" to the uniselector 24. The position of the switch 28 is conveniently set by a pushbutton switch 13 (FIG. 1).

On the other hand, if the trigger is pulled from the off position to position A (FIG. 1) the moving contact 25 moves on to the fixed contact 27 and this energizes the relay 29 to switch on the mains input to the gun. A delay may be incorporated in the relay to allow the shielding gas to be switched on before striking the arc. If now, the trigger is pulled back in the same direction to the position B (FIG. 1) then the moving contact 25 moves further along the fixed contact 27 until it also contacts the fixed contact 30 and a pulse of current is supplied to the storage register 24. Thus, programme changes can be made either before welding commences or during a welding operation and, preferably, the trigger is mounted to move against a spring pressure, the spring pressure being stronger when moving into a programme change position than when simply switching the gun on. Thus the welder has to make a positive effort to change programmes. If the programme jump required is more than one position on the reed switch connected to the input buses "a" to "j," then the appropriate number of pulses are delivered to the register by repeatedly moving the trigger into the programme change positions the required number of times.

It can be seen therefore that the welder is able to preselect his desired combination of the different variables, to store them on the plug board, and then to switch them in at appropriate times during the welding programme by actuating the trigger member on the welding torch. Alternatively, if the control system is to be used with completely nonskilled welding operators, programmes may be prestored either as prepunched masking cards which can be placed over the top deck on the selector board, or on a storage board having dummy sockets which can be placed over the plugs after they have been prearranged on the selector board.

Typical preselected combinations of the different variables are shown in FIG. 3. The vertical bars represent the output buses of a plugboard and the horizontal bars are the input buses. The board provides for different values of voltage, wire feed speed, inductance and shielding gas. For example, when voltage is applied along the first input bus (row 'a'), the following variables are chosen:

Voltage: 22½ volts.
Wire Feed Speed: 135 inches per min.
Gas: $CO_2$.
Inductance: Low.

For row "f" the following variables are chosen:

Voltage: 23 volts.
Wire Feed Speed: 160 inches per min.
Gas: Argon.
Inductance: Zero.

For row "i" the following variables are chosen:

Voltage: 32 volts.
Wire Feed Speed: 485 inches per min.
Gas: $CO_2$.
Inductance: Zero.

These programs might be, for example, for dip transfer (steel), spray transfer (aluminum) and spray transfer (steel) respectively. For pulse welding predetermined rows of the plugboard are interconnected by solid state switching.

Figure 5:
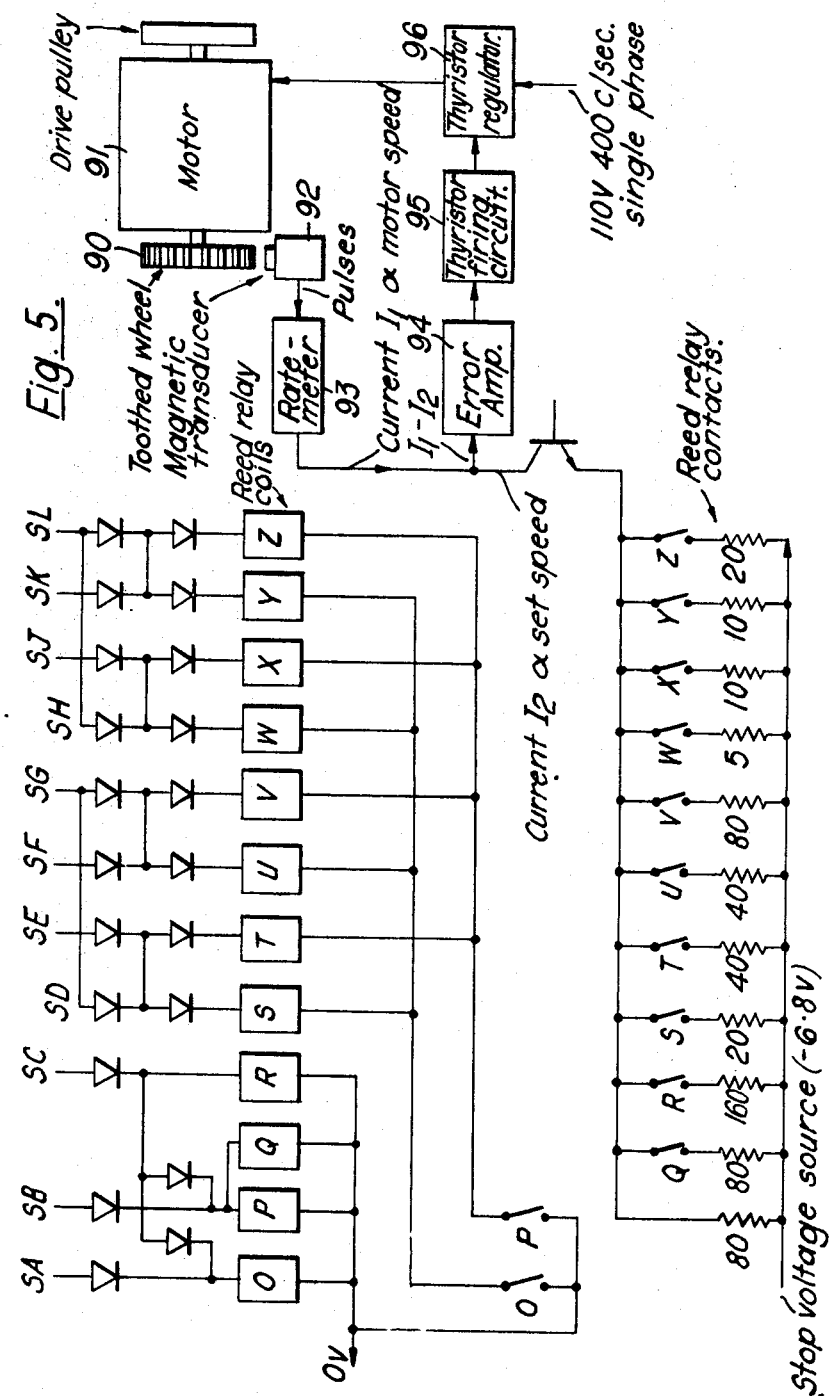
FIG. 5 shows a motor speed control circuit for use in the control system of FIG. 1.

The motor speed control system will now be described with reference to FIG. 5. Output buses SA to SL are shown connected through diode networks to the relays 0 to Z. The corresponding contacts are shown connected to resistors which are connected to a stabilized voltage source. The conductance value of each resistor gives so many inches per minute wire feed rate if in circuit. The resulting current is fed to a velocity servo system with feedback from a tachometer. In the FIG. the conventional tachometer is replaced by a toothed wheel 90 attached to the drive motor 91 and a magnetic transducer 92 together with a rate meter 93. The rate meter produces a current I1 proportional to the motor speed and this is compared with the current from the resistances which represent the required speed. The error current I1—I2 is fed to an error amplifier 94 and controls a thyristor firing circuit 95 which alters the firing angle of a thyristor regulator 96 so that the motor speed is altered to balance the two currents and so obtain the required speed.

Figure 4:
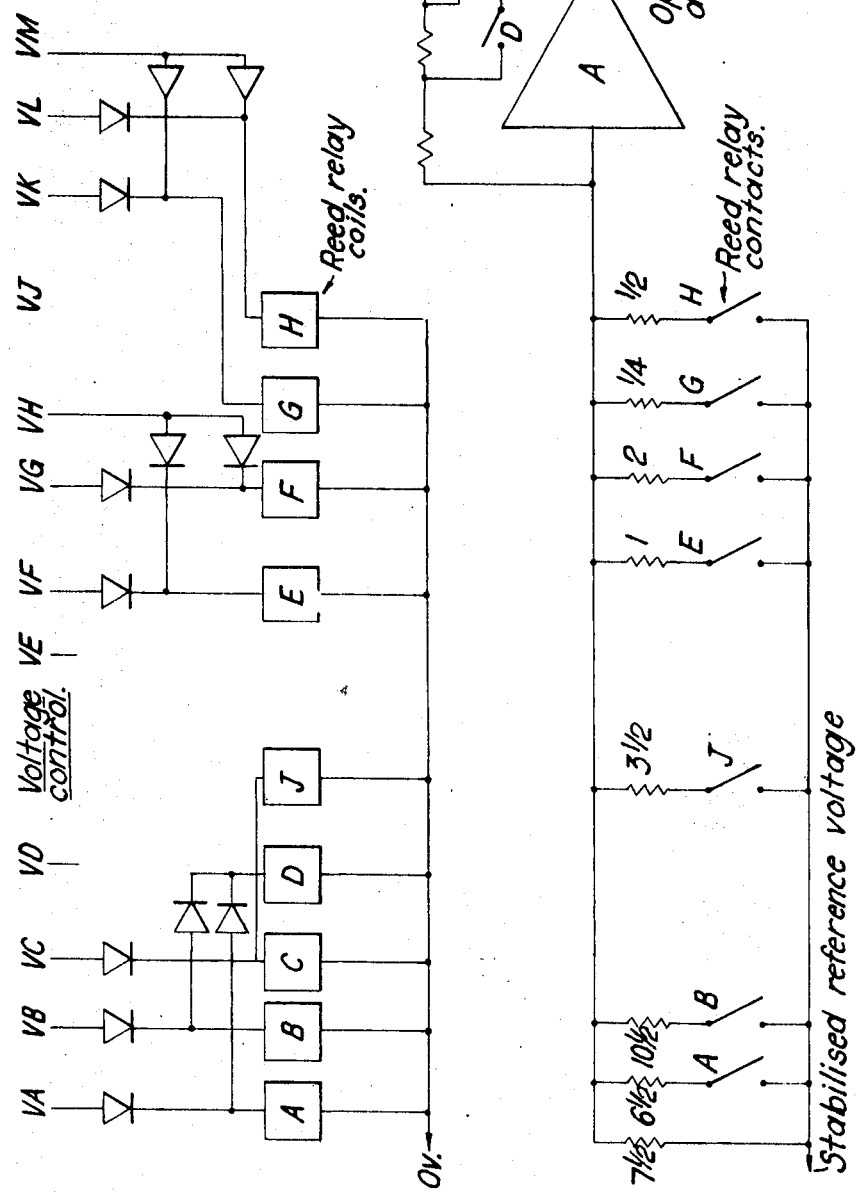
FIG. 4 is a circuit diagram showing the control of open circuit arc voltage, for use in the control system of FIG. 1.

Referring to FIG. 1 the control of the open circuit arc voltage will now be described in more detail with reference to FIG. 4. The output buses VA to VM from the plug board pass voltages through a diode network to selected ones of the reed relay coils A to H. The relay contacts are connected to resistors and when closed cause a current to flow through the corresponding resistors from a stabilized reference voltage source. The resulting voltage is passed through the operational amplifier A and the amplified voltage is used as a reference to control the phase angle of thyristors in the thyristor bridge rectifier shown in FIG. 1. The values of the resistors are chosen so that with C and D open, voltage is developed at the output which is given by the sum of conductance values. If C is closed the voltage is halved and if D is closed the voltage is quartered. The reference voltage may first be fed to a comparator where it is compared with a voltage derived from the arc voltage. The error voltage is then fed back to control the phase angle of the thyristors.

The art of welding is normally acquired only after many years of practical experience. Much of this time is taken up in familiarizing a welding operator with the effects of altering welding parameters to suit particular types of weld and particular welding conditions. The results of a change in the value of a parameter are not always immediately noticeable except to an experienced eye, and, since the change from one set of conditions to another takes time, the initial effect may be forgotten and it is often only after repeated trials that the results are firmly grasped by the operator. This makes practical experimental welding very costly, and students are not often encouraged to discover for themselves the effect of choosing a wrong value for a particular parameter.

In one application of the present invention the selection of the different combinations is synchronized with a tape recording such that, in operation, each weld made by the gun in accordance with one of the selected combinations is accompanied by a commentary explaining the effect of altering a particular variable. The gun may be held by the operator, and if so may include the selector switch permitting him to initiate a change from one programmed set of conditions, including the relevant tape commentary, to the next. Rapid switching from one programme to another is possible and hence students have no difficulty in comparing successive welds.

The plug board would allow a number of programme cards to be made up for plugging into the plug board and thereby providing different combinations of programmes. Each programme card could have its programmes arranged to highlight the effect of choosing incorrect values of current, voltage, inductance, gas flow etc. The rapid switching between programmes permits direct comparison between ideal and incorrect welding conditions, the actual differences being brought out and explained on the tape recording.

Conveniently the tape recorder has a multichannel head and FIG. 2 shows the connection of two such channels to the first two contacts of the uniselector switch. The tape START is connected in the input circuit to the uniselector and the relays RLA and RLB are energized when the uniselector connects the 24 volts source to the input buses $i$ and $j$. This closes the contacts in channel 1 or 2 of the tape recorder, and the output from the selected tape head is fed through an amplifier to a loudspeaker.

I claim:

1. A consumable electrode electric arc welding system comprising:
    a. a welding torch
    b. a supply of consumable electrode wire
    c. drive means for feeding the said supply of electrode wire to the said welding torch
    d. a power supply for the said welding torch
    e. means for varying the power delivered from the said power supply to the said welding torch
    f. means for controlling the speed at which the said electrode wire is fed to the said torch
    g. a plug board having a plurality of input buses and a plurality of output buses
    h. a plurality of actuators, interconnecting the said output buses with the said speed control and power varying means
    i. a voltage source
    j. a manually operable selector switch located between the said voltage source and the said input buses, and
    h. means for interconnecting each of the said input buses with preselected ones of the said output buses whereby as the selector switch is moved through its different positions, different preselected combinations of the said actuators are energized in turn from the said voltage source.

2. Apparatus according to claim 1 in which the said actuators are further connected to control valves for controlling the flow of different shielding gases to the said welding torch and to inductance varying means for short-circuiting different portions of an inductance connected in the power supply line to the said welding torch.

3. Apparatus according to claim 1 in which the selector switch is controlled by electrical pulses generated in response to operation of a trigger member on the welding gun.

4. Apparatus according to claim 3 in which the said trigger member actuates a moving contact of a switch and is movable in one direction from an "off" position to a first operative position to close a first circuit to produce a pulse with the gun switched "off," and in the opposite direction to a first operative position, in which a second circuit is closed to energize the gun, to a second operative position in which the first and second circuits are closed such that a pulse can be produced while the weld is being made.

5. Apparatus according to claim 4 in which the force required to move the trigger in the said opposite direction is greater when moving from the first operative position to the second operative position than when moving from the "off" position into the first operative position.

6. Apparatus according to claim 5 including a further switch in the said first circuit to control the direction in which the selector switch is switched by each of the said pulses.

7. Apparatus according to claim 6 in which the electrical pulses are fed to a uniselector reed switch to control which of the contacts of the reed switch are closed at any one time.

8. Apparatus according to claim 1 in which the means for varying the power fed to the welding torch comprises a thyristor controlled bridge rectifier and means for varying the firing angle of the said thyristors in response to the energization of preselected ones of the said actuators.

9. Apparatus according to claim 1 in which the drive means for feeding the supply of consumable electrode to the welding torch includes a drive wheel driven from a motor, the means for varying the wire feed speed comprising a servo operated control system controlling the speed of the said motor in response to the energization of preselected ones of the said actuators.

10. Apparatus according to claim 10 including a magnetic transducer and rate meter for producing a current proportional to the speed of a toothed wheel connected to the said motor, the plug board feeding a current proportional to the required speed in response to the energization of preselected ones of the said actuators, and an error amplifier and a thyristor firing circuit altering the firing angle of a thyristor regulator such that the motor speed is altered to balance the two currents, thereby obtaining the desired speed.